US012134864B2

(12) United States Patent
Swanson

(10) Patent No.: US 12,134,864 B2
(45) Date of Patent: Nov. 5, 2024

(54) FLIGHT FOR ASPHALT ROTARY DRYER

(71) Applicant: e5 Engineers, LLC, Chickamauga, GA (US)

(72) Inventor: Malcolm L. Swanson, Chickamauga, GA (US)

(73) Assignee: e5 Engineers, LLC, Chickamauga, GA (US)

( * ) Notice: Subject to any disclaimer, the term of this patent is extended or adjusted under 35 U.S.C. 154(b) by 600 days.

(21) Appl. No.: 17/545,236

(22) Filed: Dec. 8, 2021

(65) Prior Publication Data

US 2022/0307205 A1 Sep. 29, 2022

Related U.S. Application Data

(60) Provisional application No. 63/165,930, filed on Mar. 25, 2021.

(51) Int. Cl.

*E01C 19/10* (2006.01)
*E01C 19/08* (2006.01)
*F26B 11/02* (2006.01)
*F26B 25/04* (2006.01)

(52) U.S. Cl.

CPC .......... *E01C 19/1027* (2013.01); *E01C 19/08* (2013.01); *F26B 11/028* (2013.01); *F26B 25/04* (2013.01)

(58) Field of Classification Search

CPC ... E01C 19/1027; F26B 25/04; F26B 11/0477
See application file for complete search history.

(56) References Cited

U.S. PATENT DOCUMENTS

| | | | | | |
|---|---|---|---|---|---|
| 2,341,101 | A * | 2/1944 | Howard | F26B 11/0477 | 236/80 R |
| 3,025,611 | A * | 3/1962 | Preeman | E01C 19/05 | 34/109 |
| 3,807,936 | A * | 4/1974 | Vering | B65G 65/00 | 432/118 |
| 3,853,458 | A * | 12/1974 | Wurr | F27B 7/162 | 432/118 |
| 3,910,756 | A * | 10/1975 | Henning | F27D 15/028 | 432/118 |

(Continued)

*Primary Examiner* — David J Laux
(74) *Attorney, Agent, or Firm* — Luedeka Neely, P.C.

(57) ABSTRACT

An improved geometry for flights used in rotary drums of aggregate dryers in the manufacture of asphalt causes the aggregate to shower in an even veil across the full width of the drum under all loading conditions. An opening in the flight having a narrow bottom and wider top allows more aggregate to shower early, especially when flights are lightly loaded, on the uplift side of the drum to complete the aggregate veil and prevent hot gases from bypassing. The opening is oriented with its narrow bottom nearest the inner surface of the drum and its wider top farthest therefrom. The opening does not extend through the full height of the flight, which would form an undesired gap allowing an excessive volume of aggregate to flood out of fully loaded flights on the uplift side of rotation. Such flooding discharge causes a similar imbalance of drying to that caused by too little discharge from light loaded flights. The size and shape of the opening can be varied to adjust the amount of aggregate discharged from each flight to form the veil and to adjust the shape of the veil.

16 Claims, 4 Drawing Sheets

(56) References Cited

U.S. PATENT DOCUMENTS

| | | | | | |
|---|---|---|---|---|---|
| 4,172,701 | A * | 10/1979 | Bernt | F27B 7/162 | 432/103 |
| 4,193,208 | A * | 3/1980 | Ronning | F26B 11/0477 | 366/225 |
| 4,338,732 | A * | 7/1982 | Coxhill | E01C 19/1036 | 432/118 |
| 4,422,848 | A * | 12/1983 | Musil | F27B 7/20 | 432/118 |
| 4,558,525 | A * | 12/1985 | Duske | F26B 11/0413 | 34/136 |
| 4,639,216 | A * | 1/1987 | Schnupp | F27B 7/161 | 432/118 |
| 5,083,382 | A * | 1/1992 | Brashears | F26B 11/0463 | 432/118 |
| 5,302,118 | A * | 4/1994 | Renegar | F23G 7/14 | 432/106 |
| 5,746,006 | A * | 5/1998 | Duske | F26B 17/106 | 34/136 |
| 5,904,904 | A * | 5/1999 | Swanson | B09C 1/06 | 432/109 |
| 6,726,351 | B2 * | 4/2004 | Dillman | F26B 11/0477 | 432/118 |
| 7,204,636 | B2 * | 4/2007 | Didion | B01F 29/63 | 366/147 |
| 9,382,672 | B2 | 7/2016 | Swanson | | |
| 9,492,946 | B2 | 11/2016 | Meeker et al. | | |
| 9,644,329 | B2 | 5/2017 | Mollick et al. | | |
| 9,835,374 | B2 | 12/2017 | Swanson | | |
| 11,008,713 | B2 * | 5/2021 | Swanson | F26B 25/04 | |
| 11,543,184 | B2 * | 1/2023 | Son | F27B 7/16 | |

* cited by examiner

FLIGHT FOR ASPHALT ROTARY DRYER

RELATED APPLICATIONS

This application claims priority to U.S. provisional patent application Ser. No. 63/165,930, filed Mar. 25, 2021, titled Flight for Asphalt Plant Rotary Dryer, the entire contents of which are incorporated herein by reference.

FIELD

This invention relates to the field of asphalt paving materials and processes. More particularly, this invention relates to a dryer for use in an asphalt plant.

BACKGROUND

A high percentage of the roads around the world are paved with asphaltic concrete. In the United States, over 95% of paved roads are paved with asphalt. Millions of tons of asphaltic concrete are produced by asphalt plants each year. There are well over 3,000 asphalt plants in operation in the United States alone. Due to such a large number of plants in operation and the amount of asphaltic concrete being produced, the materials and energy consumed and the emissions produced are extremely important from a sustainability point of view.

The production process of conventional asphalt plants involves drying of mineral aggregate materials, such as crushed rock and sand. Of course, drying is the removal of moisture from these materials. Efficient drying requires exposure of the wet surfaces of the aggregate to hot gases produced by a burner of a rotary dryer. It is common in the industry to have a number of steel fabrications called flights attached to inner surfaces of the rotating dryer drum to lift and shower aggregate into the hot gas stream of the burner. This has proven to be an effective means of exposing large amounts of wet surface area to the burner gases to accelerate and enhance drying.

Many different configurations of flights have been employed in this application. However, all flights thus far have been deficient in producing a perfectly even veil of showering aggregate across the full width of the rotating drum. This deficiency allows some of the hot gases to bypass the veil of showering aggregate, thereby reducing the thermal efficiency of the rotary dryer.

Recent advances in flight design have improved flight and dryer performance. However, no flights have yet produced a perfectly even veil across the full width of the dryer drum. Specifically, when lightly loaded, even the most advanced flights shower little or no material on the upward moving side of the rotating drum, thereby allowing heat to escape the dryer and be lost from the process. This results not only in a loss of efficiency and productivity but also in excessively high exhaust system temperatures. This lightly loaded condition is very important because it occurs when the asphalt plant is producing mixes with high content of recycled asphalt pavement (RAP). The ability to produce such mixes is important to the sustainability of asphalt pavement material production and to its profitability.

The most advanced flights have a deep notch in the central portion of the flight. These are referred to as the Astec V-Flight and the Astec Parabolic flight. The notch in these flights, which is open at the top, allows aggregate to flood out of a full flight on the uplift side of the drum's rotation. This creates a veil that is too heavy in that part of the drum. Hot exhaust gases encountering the restriction to flow thus created are diverted to the less dense veil in the central and downward rotating parts of the drum. This causes uneven exposure of aggregate surfaces to hot gases.

What is needed, therefore, is a flight for an asphalt dryer drum that produces a perfectly even veil across the full width of the drum. Instead of a gap, the needed flight has an opening that restricts the spilling of aggregate on the uplift side, thereby reserving aggregate for the rest of the drum diameter. This helps make the veil more uniform in the heavily loaded condition.

SUMMARY

The above and other needs are met by an improved geometry for flights used in rotary aggregate dryers employed in the manufacture of asphaltic concrete pavement mixtures. Embodiments described herein improve the showering characteristics of the dryer flights so that aggregate is showered in a more even veil across the full width of the rotary drum under all conditions of loading, and including on the upward moving side when very lightly loaded and when very heavily loaded. As with most systems, the extremes are the most difficult to manage.

Experimentation has demonstrated that an opening in the flight allows an increased amount of aggregate to shower early on the uplift side of the drum to complete the aggregate veil and prevent hot gases from bypassing. In a preferred embodiment, the shape of the opening is formed by combinations of isosceles trapezoids formed by multiple straight-line segments. In some embodiments, the shape may be approximated by a curved shape, which may be described as pear shaped. For example, the straight-line segments may form portions of two vertically-adjacent isosceles trapezoids. The opening is preferably oriented so that the bottom of the curve is nearest to the inside surface of the round dryer drum, and the straight side of the opening is farthest from the inner surface of the drum. The top of the opening is bounded by the steel plate of the flight that has not been cut out in forming the opening. The opening does not extend through the full height of the flight, which would form an undesired notch or gap. The size and exact shape of the opening can be varied to adjust the amount of aggregate discharged from each flight to form the veil and to adjust the shape of the veil. Flights having different sizes and shapes of openings may be used in the same rotary dryer drum to improve the veil. It is not necessary for the curved line of the opening to be a smooth curved cut, as it is possible for the curved cut to be approximated by any number of straight cuts.

In one aspect, embodiments of the invention are directed to a dryer configured for use in an asphalt plant. In one preferred embodiment, the dryer comprises a drum having an interior with an inner wall, and a flight disposed within the interior of the drum. The flight includes a proximal edge attached to the inner wall of the drum, and a distal edge that is spaced apart from the proximal edge. The flight is defined by a first shape profile extending from the proximal edge to the distal edge. An opening disposed within the flight has a shape defined by a plurality of isosceles trapezoids that each comprise a plurality of line segments connected end-to-end. The plurality of isosceles trapezoids include at least a first isosceles trapezoid and a second isosceles trapezoid.

The first isosceles trapezoid comprises an upper line segment, a pair of first middle line segments, and a middle line. The upper line segment is spaced apart from the distal edge of the flight. The upper line segment has a first end and a second end. The pair of first middle line segments are disposed between the upper line segment and the proximal edge of the flight. The pair of first middle line segments include a first left middle line segment and a first right middle line segment. The first left middle line segment is connected to the first end of the upper line segment, wherein the first left middle line segment and the upper line segment intersect at an angle. The first right middle line segment is connected to the second end of the upper line segment, wherein the first right middle line segment and the upper line segment intersect at an angle. The middle line is disposed below and parallel to the upper line segment. The middle line has a first end connected to the first left middle line segment and a second end connected to the first right middle line segment.

The second isosceles trapezoid comprises the middle line, a pair of second middle line segments, and a lower line segment. The pair of second middle line segments are disposed between the middle line and the proximal edge of the flight. The pair of second middle line segments include a second left middle line segment and a second right middle line segment. The second left middle line segment is connected to the first end of the middle line, wherein the second left middle line segment and the middle line intersect at an angle. The second right middle line segment is connected to the second end of the middle line, wherein the second right middle line segment and the middle line intersect at an angle. The lower line segment is disposed below and parallel to the middle line. The lower line segment has a first end connected to the second left middle line segment and a second end connected to the second right middle line segment.

In some embodiments, the opening is centrally located between left and right ends of the flight.

In some embodiments, the width of the opening measured between the first and second ends of the upper line segment is between 40% and 60% of the length of the flight measured between the right and left edges of the flight.

In some embodiments, the upper line segment of the opening is parallel to the distal edge of the flight.

In some embodiments, the first left middle line segment and the first right middle line segment are of equal length, and the second left middle line segment and the second right middle line segment are of equal length.

In some embodiments, one or more of the plurality of line segments that comprise the first and second isosceles trapezoids are straight line segments.

In some embodiments, the first shape profile of the flight is scoop-shaped, such that the flight is operable to sequentially contain, lift, and discharge aggregate materials within the interior of the drum as the drum rotates.

In some embodiments, the first shape profile of the flight is defined by three bends disposed between four plate sections.

In some embodiments, the dryer includes an L-bracket that attaches the proximal edge of the flight to the inner wall of the drum. In these embodiments, one of the four plate sections of the flight is a flange section disposed adjacent to the proximal edge of the flight, and the L-bracket is secured to the flange section.

In some embodiments, the flight comprises separable left and right plates that are symmetrically opposed on either side of a centerline of the flight that divides the opening into two symmetrically opposed halves. The left and right plates of the flight are operable to be joined together along the centerline to form the flight and the central opening.

In another aspect, embodiments of the invention are directed to a dryer flight configured for attachment to an inner wall of a drum of a dryer. As the drum rotates, the dryer flight scoops, carries, and showers aggregate materials used in making asphalt pavements. The dryer flight is preferably configured according to the geometry described above.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 4:
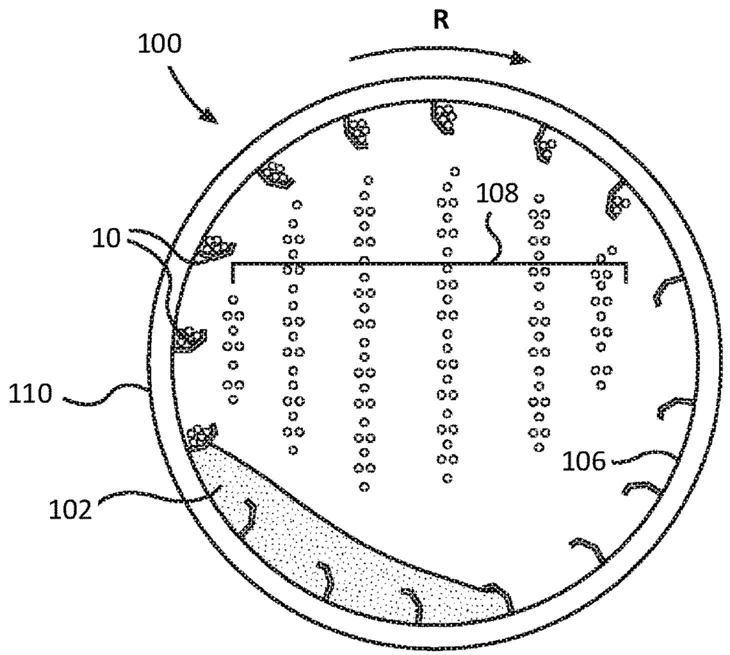
FIG. 4 depicts the interior of an asphalt dryer drum according to an embodiment of the invention.

FIG. 4 depicts a rotary dryer 100 for use in an asphalt plant. The dryer 100 includes an elongate cylindrical drum 110 set at an incline and through which flows heated air or combustion gases from a burner. Aggregate material 102 to be dried is introduced at an entrance to the drum 110, and as the material travels through the drum under the force of gravity, it comes into contact with the heated air. Attached to the interior peripheral walls of the drum 110 are multiple radially-spaced fin-like structures referred to as flights 10. The flights 10 aid in circulating the aggregate material 102 while increasing the amount of time the aggregate material 102 remains exposed to the heated air and/or combustion gases inside the drum 110. In this manner, the flights 10 improve the efficiency of the dryer 100 by increasing the heat transfer between the heated air and the aggregate material. With continued reference to FIG. 4, as the drum 100 rotates in direction "R," the flights 10 retain and raise portions of the aggregate material 102 toward the top of the drum 110. As it nears the top of the drum 110, the aggregate material 102 showers downward from the flights 10 and falls through the flow of heated air, creating a curtain 108 of aggregate material 102 across the width of the drum 110.

A proper geometry of the flights 10 is critical in producing an evenly distributed curtain 108 of aggregate material 102 across the diameter of the drum for various operating conditions, which may be affected by differences in the mix of aggregate material and differences the processing rates and volumes. FIGS. 1, 2, 3A-3B and 5 depict a preferred embodiment of a flight 10 having a geometry optimized for this purpose.

Figure 3A:
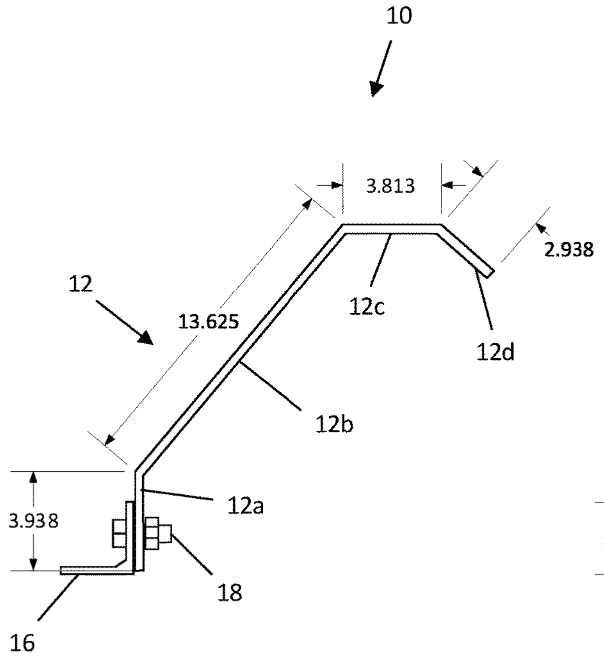
FIGS. 3A and 3B depict an end elevation view of the flight of FIG. 1.
Figure 3B:
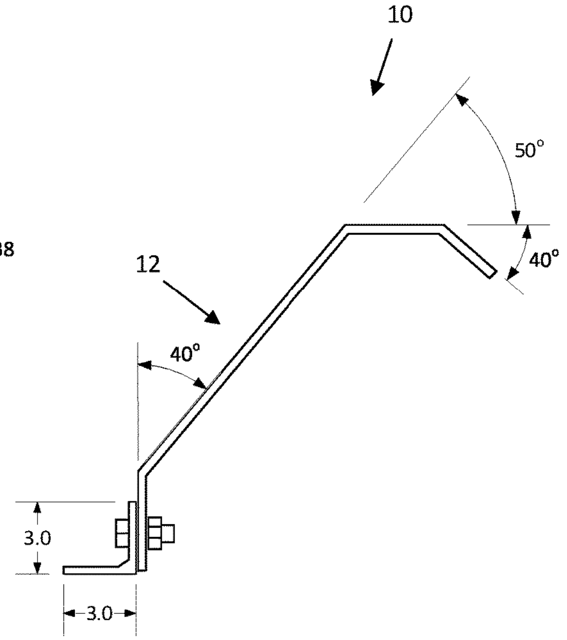

The flight 10 preferably comprises scoop-shaped right and left plates 12 and 14 that are joined together by an angle bracket 16. The plates 12 and 14 are secured to the bracket 16 by bolts 18. As shown in the profile views of FIGS. 3A and 3B, the plates 12 and 14 are bent at three locations to form the scoop-shaped profile. Although only plate 12 is depicted in FIGS. 3A and 3B, it will be appreciated that plate 14 is bent in the same manner. In a preferred embodiment, each plate 12 and 14 includes four plate sections—such as plate sections 12*a*, 12*b*, 12*c* and 12*d* in plate 12—defined by the three bends. It will be appreciated that other embodiments may include fewer or more plate sections defined by fewer or more bends.

Figure 1:
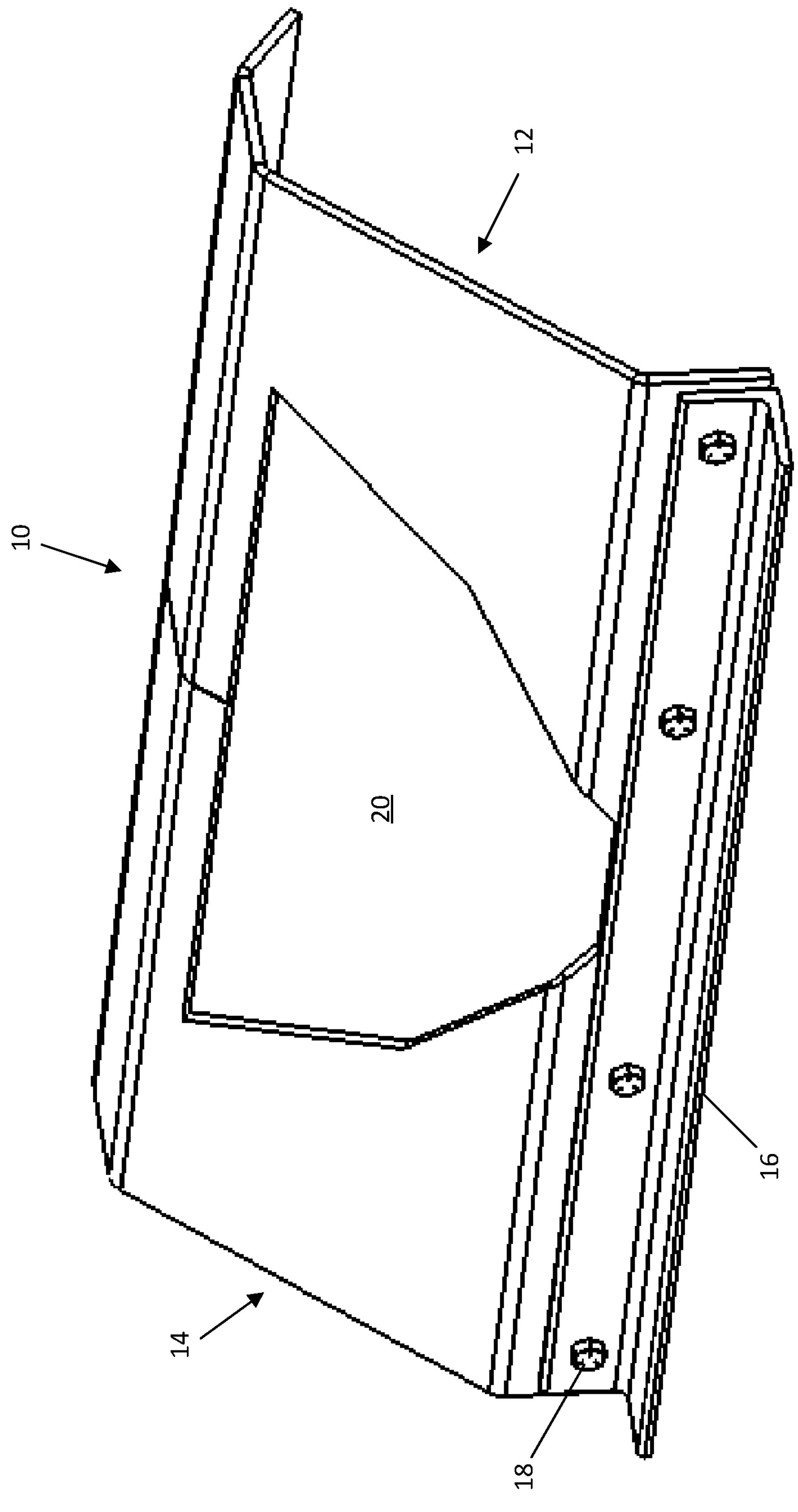
FIG. 1 depicts a perspective view of a flight for an asphalt dryer according to an embodiment of the invention.
Figure 2:
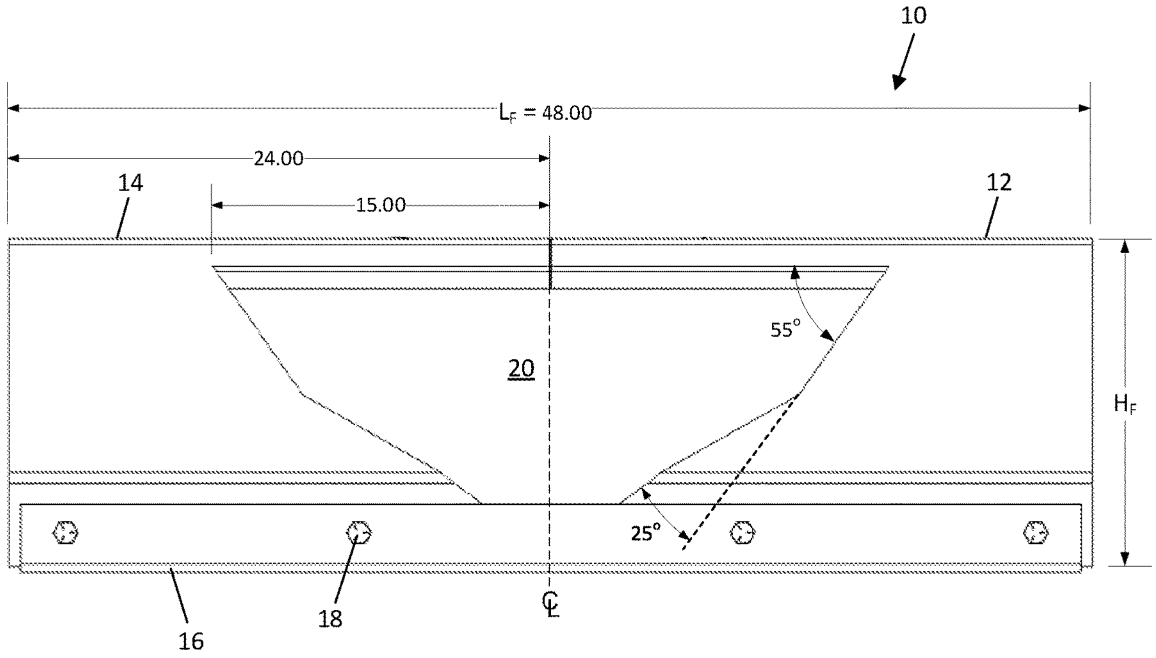
FIG. 2 depicts a front elevation view of the flight of FIG. 1.

As shown in FIGS. 1 and 2, the plates 12 and 14 each have a cutout on their inside edges, such that when the inside edges are joined, the cutouts form a symmetrical opening 20 shaped as a series of adjacent isosceles trapezoids in the center of the flight 10. The opening 20 is oriented with its straight top parallel to the length of the flight 10, thereby allowing the aggregate material 102 to drop through the opening 20 and shower into the hot air/gas stream from the burner of the dryer 100 as the drum 110 rotates the flight 10 upward. This action promotes the early showering of the aggregate material 102, especially when the drum 110 is lightly loaded. Such a showering characteristic is particularly advantageous when making asphalt paving mixtures having high content of recycled asphalt pavement, as well as certain other mixes that tend to reduce the capacity of the dryer 100.

In preferred embodiments, the overall length $L_{S0}$ of the opening 20 is parallel to the length of the flight, and is about 40% to 60% of the total length $L_F$ of the flight 10. In the embodiment depicted in FIGS. 2 and 5, $L_{S0}$ is 30 inches and $L_F$ is 48 inches, such that $L_{S0}$ is about 63% of $L_F$. In preferred embodiments, the height $H_O$ of the opening 20 is about 50% to 80% of the height $H_F$ of the flight 10, as measured in a radial direction from the inner surface of the drum 110. In the embodiment depicted in FIGS. 2 and 5, the height $H_O$ is approximately 10 inches and the height $H_F$ is 14.56 inches, such that $H_O$ is about 70% of $H_F$.

In the preferred embodiment, the opening 20 is centered within the length of a single flight 10. However, in alternative embodiments, two flights—each containing half of the opening 20—may be positioned end to end in such a manner as to form the full opening 20.

Figure 5:
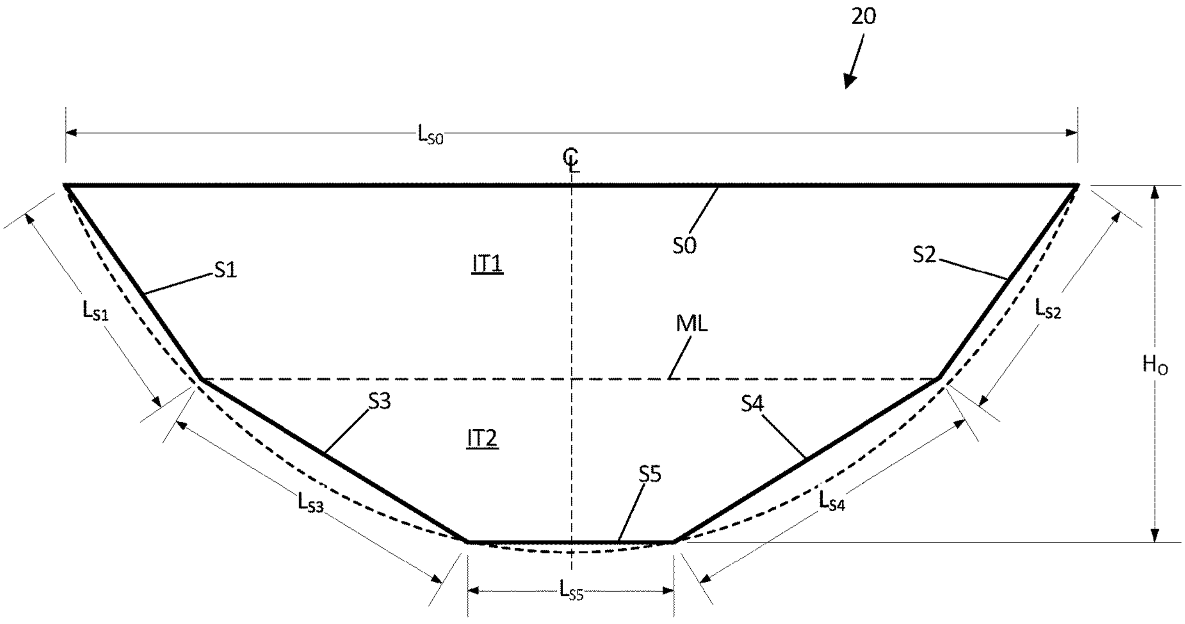
FIGS. 5 and 6 depict the profile of an opening in the flight of FIG. 1.

As depicted in FIG. 5, a preferred embodiment of the opening 20 is defined by a pair of isosceles trapezoids IT1 and IT2 that each comprise multiple line segments connected end-to-end. The line segments include an upper line segment S0, four middle line segments S1-S4, and a lower line segment S5. The first isosceles trapezoid IT1 includes the upper line segment S0, the two middle line segments S1 and S2, and the middle line ML. The second isosceles trapezoid IT2 includes the middle line ML, the two middle line segments S3 and S4, and the lower line segment S5.

In the embodiment depicted in FIG. 5, the upper line segment S0 of the opening 20 has a length $L_{S0}$ of 30 inches, the two middle line segments S1 and S2 have lengths $L_{S1}$ and $L_{S2}$ of 8.48 inches, the two middle line segments S3 and S4 have lengths $L_{S3}$ and $L_{S4}$ of 9.84 inches, and the lower line segment S5 has a length $L_{S5}$ of 6.00 inches.

Figure 6:
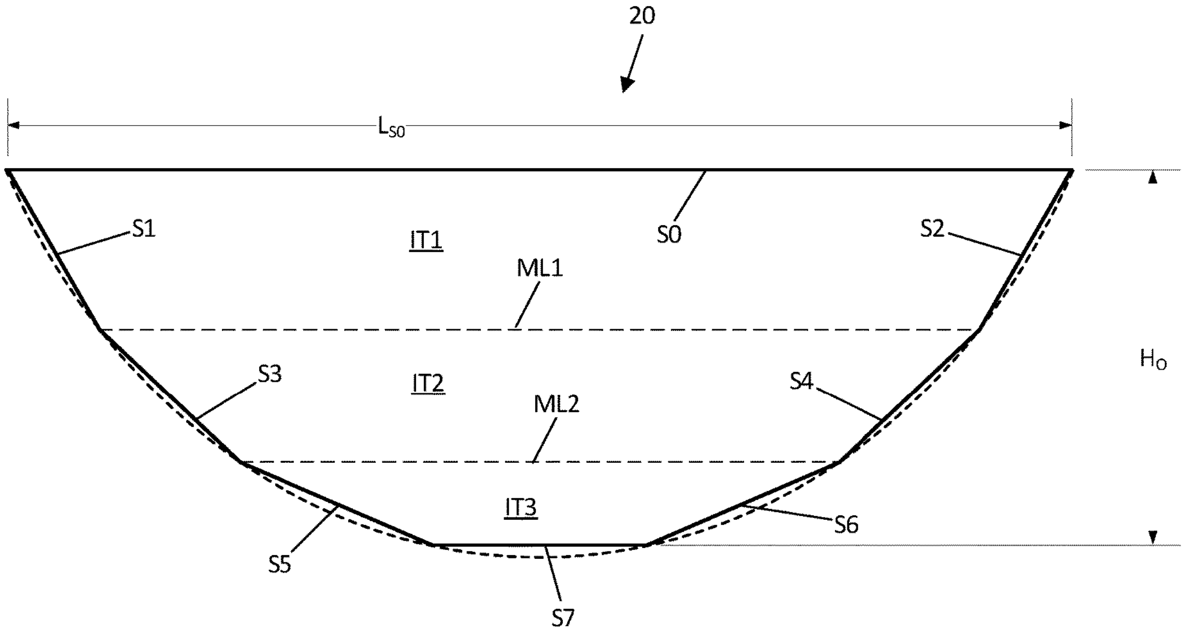

In some embodiments, the shape of the opening 20 is approximately pear shaped, with the line segments S1-S5 being fit to a pear-shaped curve. It will be appreciated that more lower segments could be included to more closely fit a continuous curve, such as the dashed-line curve shown in FIG. 5. For example, in the embodiment of FIG. 6, there are seven lower line segments S1-S7 that form three isosceles trapezoids. As the term is used herein, "fitting" a curve means forming a piecewise linear approximation of a curve using multiple line segments connected end-to-end, although this does not require any of the lines or endpoints of the line segments to coincide exactly with any particular curve. Also, the curve of the opening 20 may exactly follow a continuous curve in some embodiments.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A dryer configured for use in an asphalt plant, the dryer comprising:
- a drum having an interior with an inner wall; and
- a flight disposed within the interior of the drum, the flight comprising:
  - a proximal edge attached to the inner wall of the drum;
  - a distal edge that is spaced apart from the proximal edge; and
  - an opening having a shape defined by a plurality of isosceles trapezoids that each comprise a plurality of line segments connected end-to-end, the plurality of isosceles trapezoids comprising at least:
    - a first isosceles trapezoid comprising:
      - an upper line segment spaced apart from the distal edge of the flight, the upper line segment having a first end and a second end;
      - a pair of first middle line segments disposed between the upper line segment and the proximal edge of the flight, the pair of first middle line segments comprising:
        - a first left middle line segment connected to the first end of the upper line segment, wherein the first left middle line segment and the upper line segment intersect at an angle; and
        - a first right middle line segment connected to the second end of the upper line segment, wherein the first right middle line segment and the upper line segment intersect at an angle; and
      - a middle line disposed below and parallel to the upper line segment, the middle line having a first end connected to the first left middle line segment and a second end connected to the first right middle line segment; and
    - a second isosceles trapezoid comprising:
      - the middle line;
      - a pair of second middle line segments disposed between the middle line and the proximal edge of the flight, the pair of second middle line segments comprising:
        - a second left middle line segment connected to the first end of the middle line, wherein the second left middle line segment and the middle line intersect at an angle; and
        - a second right middle line segment connected to the second end of the middle line, wherein the second right middle line segment and the middle line intersect at an angle; and
      - a lower line segment disposed below and parallel to the middle line, the lower line segment having a first end connected to the second left middle line segment and a second end connected to the second right middle line segment.

2. The dryer of claim 1 wherein the opening is centrally located between left and right edges of the flight.

3. The dryer of claim 1 wherein a width of the opening measured between the first and second ends of the upper line segment is between 40% and 60% of a length of the flight measured between right and left edges of the flight.

4. The dryer of claim 1 wherein the upper line segment is parallel to the distal edge of the flight.

5. The dryer of claim 1 wherein the first left middle line segment and the first right middle line segment are of equal length, and the second left middle line segment and the second right middle line segment are of equal length.

6. The dryer of claim 1 wherein one or more of the plurality of line segments that comprise the first and second isosceles trapezoids are straight line segments.

7. The dryer of claim 1 wherein the flight has a first shape profile that is scoop-shaped, such that the flight is operable to sequentially contain, lift, and discharge aggregate materials within the interior of the drum as the drum rotates.

8. The dryer of claim 1 wherein the flight comprises separable left and right plates that are symmetrically opposed on either side of a centerline of the flight that divides the opening into two symmetrically opposed halves, and wherein the left and right plates of the flight are operable to be joined together along the centerline to form the flight and the central opening.

9. A dryer flight configured for attachment to an inner wall of a drum of a dryer, wherein as the drum rotates, the dryer flight scoops, carries, and showers aggregate materials used in making asphalt pavements, the dryer flight comprising:

- a proximal edge configured for attachment to the inner wall of the drum;
- a distal edge that is spaced apart from the proximal edge; and
- an opening having a shape defined by a plurality of isosceles trapezoids that each comprise a plurality of line segments connected end-to-end, the plurality of isosceles trapezoids comprising at least:
  - a first isosceles trapezoid comprising:
    - an upper line segment spaced apart from the distal edge of the flight, the upper line segment having a first end and a second end;
    - a pair of first middle line segments disposed between the upper line segment and the proximal edge of the flight, the pair of first middle line segments comprising:
      - a first left middle line segment connected to the first end of the upper line segment, wherein the first left middle line segment and the upper line segment intersect at an angle; and
      - a first right middle line segment connected to the second end of the upper line segment, wherein the first right middle line segment and the upper line segment intersect at an angle; and
    - a middle line disposed below and parallel to the upper line segment, the middle line having a first end connected to the first left middle line segment and a second end connected to the first right middle line segment; and
  - a second isosceles trapezoid comprising:
    - the middle line;
    - a pair of second middle line segments disposed between the middle line and the proximal edge of the flight, the pair of second middle line segments comprising:
      - a second left middle line segment connected to the first end of the middle line, wherein the second left middle line segment and the middle line intersect at an angle; and
      - a second right middle line segment connected to the second end of the middle line, wherein the second right middle line segment and the middle line intersect at an angle; and
    - a lower line segment disposed below and parallel to the middle line, the lower line segment having a first end connected to the second left middle line segment and a second end connected to the second right middle line segment.

10. The dryer flight of claim 9 wherein the opening is centrally located between left and right edges of the dryer flight.

11. The dryer flight of claim 9 wherein a width of the opening measured between the first and second ends of the upper line segment is between 40% and 60% of a length of the flight measured between right and left edges of the dryer flight.

12. The dryer flight of claim 9 wherein the upper line segment is parallel to the distal edge of the dryer flight.

13. The dryer of claim 9 wherein the first left middle line segment and the first right middle line segment are of equal length, and wherein second left middle line segment and the second right middle line segment are of equal length.

14. The dryer of claim 9 wherein one or more of the plurality of line segments that comprise the first and second isosceles trapezoids are straight line segments.

15. The dryer of claim 9 wherein a first shape profile of the flight is scoop-shaped, such that the flight is operable to sequentially contain, lift, and discharge aggregate materials within the interior of the drum as the drum rotates.

16. The dryer of claim 9 wherein the flight comprises separable left and right plates that are symmetrically opposed on either side of a centerline of the flight that divides the opening into two symmetrically opposed halves, and wherein the left and right plates of the flight are operable to be joined together along the centerline to form the flight and the central opening.

* * * * *